(12) United States Patent
Hossain et al.

(10) Patent No.: US 9,599,092 B2
(45) Date of Patent: Mar. 21, 2017

(54) WIND GENERATOR SYSTEM WITH MULTIPLE TURBINES

(71) Applicants: Md Maruf Hossain, Memphis, TN (US); Mohd Hasan Ali, Germantown, TN (US)

(72) Inventors: Md Maruf Hossain, Memphis, TN (US); Mohd Hasan Ali, Germantown, TN (US)

( * ) Notice: Subject to any disclaimer, the term of this patent is extended or adjusted under 35 U.S.C. 154(b) by 0 days.

(21) Appl. No.: 14/309,053

(22) Filed: Jun. 19, 2014

(65) Prior Publication Data

US 2014/0375061 A1     Dec. 25, 2014

Related U.S. Application Data

(60) Provisional application No. 61/836,694, filed on Jun. 19, 2013.

(51) Int. Cl.
  *F03D 9/00* (2016.01)
  *F03D 1/02* (2006.01)

(52) U.S. Cl.
  CPC .............. *F03D 1/02* (2013.01); *F03D 9/002* (2013.01); *F05B 2260/4021* (2013.01); *Y02E 10/725* (2013.01)

(58) Field of Classification Search
  CPC ...................................................... F03D 3/005
  USPC .......................................................... 290/55
  See application file for complete search history.

(56) References Cited

U.S. PATENT DOCUMENTS

| | | | |
|---|---|---|---|
| 4,037,983 A * | 7/1977 | Poeta .............................. | 415/4.2 |
| 4,265,086 A * | 5/1981 | Bahrenburg ..................... | 60/398 |
| 7,528,498 B2 * | 5/2009 | Yeh ................................. | 290/55 |
| 7,728,455 B2 * | 6/2010 | Branco ........................... | 290/55 |
| 9,410,534 B2 * | 8/2016 | Grieve .................... | F03D 15/00 |
| 2011/0006539 A1 * | 1/2011 | Lefranc .................. | F03D 9/005 290/55 |
| 2011/0018269 A1 * | 1/2011 | Moser ................... | F03D 7/0204 290/44 |
| 2014/0077505 A1 * | 3/2014 | Ishimine ................ | F03D 11/04 290/55 |

FOREIGN PATENT DOCUMENTS

| | | | |
|---|---|---|---|
| CN | 1587683 A | * | 3/2005 |
| CN | 101446270 A | * | 6/2009 |
| CN | 202273810 U | * | 6/2012 |
| CN | 202746098 U | * | 2/2013 |
| KR | 2013130589 A | * | 12/2013 |
| SU | 1557351 A | * | 4/1990 |
| SU | 1776870 A1 | * | 11/1992 |

* cited by examiner

*Primary Examiner* — Joseph Waks

(74) *Attorney, Agent, or Firm* — W. Edward Ramage; Baker Donelson

(57) ABSTRACT

A system for generating wind energy or wind power through multiple wind turbines. Each wind turbine can be smaller than a single conventional wind turbine. A series of wind turbines are mechanically connected by a chain, cable, or similar mechanical linkage to each other and to a single generator, which is located elsewhere (i.e., not in the nacelle or on the turbine tower). This permits the size and weight of each turbine to be reduced, resulting in the ability to generate electricity at lower wind speeds (e.g., where the wind speed is below the cut-in wind speed of 4 m/s or 9 mph for conventional wind turbines). The reduction in size and weight also reduces the inertia of each turbine, increasing its efficiency.

14 Claims, 2 Drawing Sheets

Figure: Wind Generator with MultipleTurbines (Rear View)

WIND GENERATOR SYSTEM WITH MULTIPLE TURBINES

This application claims benefit of and priority to U.S. Provisional Application No. 61/836,694, filed Jun. 19, 2013, and is entitled to that filing date for priority. The specification, figures and complete disclosure of U.S. Provisional Application No. 61/836,694 are incorporated herein by specific reference for all purposes.

FIELD OF INVENTION

This invention relates to a system for generation of wind energy through multiple wind turbines.

BACKGROUND OF INVENTION

Wind energy or wind power refers to the process by which the wind is used to generate mechanical power or electricity. Wind turbines convert the kinetic energy of the wind into mechanical power and that mechanical power is used to generate electricity. The generation of electricity by wind turbines is dependent on the strength of the wind at any given moment. Wind farm sites are chosen after careful analysis to determine the pattern of the wind regime, including its relative strength and direction at different times of the day and year.

In a conventional wind turbine, a large tower rests on a deep, solid foundation, supporting a nacelle with rotating blades at the top of the tower, the nacelle containing a gearbox, generator, power electronic devices, and yaw mechanism. The radius of the blades is large, as is the total weight carried by the tower. As a result, conventional wind turbines begin to produce power at wind speeds of about 4 m/s (9 mph) (i.e., the cut-in wind speed, or minimum wind speed needed to generate electricity), achieve rated power at approximately 12 m/s (29 mph), and stop power production at 25 m/s (56 mph). Examples of wind turbines are described in U.S. Pat. No. 8,729,721 (Borgen et al.), U.S. Pat. No. 8,721,258 (Ericksen et al.), and U.S. Pat. No. 8,669,672 (Stiesdal), all of which are incorporated herein by specific reference for all purposes.

SUMMARY OF INVENTION

In various embodiments, the present invention comprises a system for generating wind energy or wind power through multiple wind turbines. Each wind turbine can be smaller than a single conventional wind turbine. A series of wind turbines are mechanically connected by a chain, cable, or similar mechanical linkage to each other and to a single generator, which is located elsewhere (i.e., not in the nacelle or on the turbine tower). This permits the size and weight of each turbine to be reduced, resulting in the ability to generate electricity at lower wind speeds (e.g., where the wind speed is below the cut-in wind speed of 4 m/s or 9 mph for conventional wind turbines). The reduction in size and weight also reduces the inertia of each turbine, increasing its efficiency.

The system of the present invention thus increases the number of locations where wind farms can be located, and also increases the capacity for power generation at any location due to the increase in the wind speed range where power generation is possible. Further, the present system can allow for the implementation of a higher capacity single wind generator in a particular location, in contrast to a wind generator driven by a single turbine. The system also allows for future growth in the capacity of generators due to the use of higher-rated power electronic devices.

In one exemplary embodiment, the system comprises a plurality of wind turbines mechanically connected to each other, and to a single generator. In the embodiment shown, three turbines are shown, although the present system can work with any number of turbines, and some advantages can be achieved even with a single wind turbine. Each turbine comprises a number of turbine blades connected to a hub at the top of a pole or tower. The hub has a shaft mechanically connected to a set of sprockets, chainwheels, cranks, or pulleys, which may be exposed or covered (such as in a modified nacelle). A pitch control mechanism may be employed as well.

The sprockets, chainwheels, cranks or pulleys on adjacent turbines are connected by a chain, cable, or similar mechanical linkage. In the embodiment shown, at least two sprockets, chainwheels, cranks or pulleys are used, with each being mechanically connected to a corresponding sprocket, chainwheel, crank or pulley on an adjacent turbine in the case where a turbine is located between two turbines. In the case where a turbine is on the end of a line or sequence of turbines, it will only be connected to one adjacent turbine.

An electrical generator is similarly mechanically linked to at least one of the turbines. The generator is linked by a chain to a third gear, crank or pulley on the middle turbine of a sequence of three or more. The electrical generator may be located on the ground, on a platform, on a pole, or other location. This allows the individual turbines to be lighter, thereby reducing the total load on the tower or pole. In one embodiment, the generator may be located in the nacelle of one of the turbines in the sequence, and that tower or pole may be increased in strength to handle the increase in total load.

In various embodiments, the present invention possesses several advantages over the prior art. No gearbox, electric generator, power electronic devices, or yaw mechanisms need be placed at the top of the tower, thereby reducing the total weight carried by the tower. Gear ratio can be maintained by proper selection of the gears and cranks of the generator and the turbine, so no conventional gearbox is required. The mechanical energy of multiple turbines is accumulate to the shaft of a single large generator. The number of generator and power electronic interfaces and systems is reduced, thereby reducing overall construction and installation costs and maintenance costs. In systems where the generator is set near the ground, maintenance and repair are substantially easier.

Another significant advantage is the reduction in the radius of the blades of each wind turbine, which decreases based on the number of wind turbines. This reduces the size and weight of each turbine, which reduces construction and installation costs as well as maintenance and repair costs.

DETAILED DESCRIPTION OF EXEMPLARY EMBODIMENTS

In various embodiments, the present invention comprises a system for generating wind energy or wind power through multiple wind turbines. Each wind turbine can be smaller than a single conventional wind turbine. A series of wind turbines are mechanically connected by a chain, cable, or similar mechanical linkage to each other and to a single generator, which is located elsewhere (i.e., not in the nacelle or on the turbine tower). This permits the size and weight of each turbine to be reduced, resulting in the ability to generate electricity at lower wind speeds (e.g., where the wind speed is below the cut-in wind speed of 4 m/s or 9 mph for conventional wind turbines). The reduction in size and weight also reduces the inertia of each turbine, increasing its efficiency.

The system of the present invention thus increases the number of locations where wind farms can be located, and also increases the capacity for power generation at any location due to the increase in the wind speed range where power generation is possible. Further, the present system can allow for the implementation of a higher capacity single wind generator in a particular location, in contrast to a wind generator driven by a single turbine. The system also allows for future growth in the capacity of generators due to the use of higher-rated power electronic devices.

Figure 1:
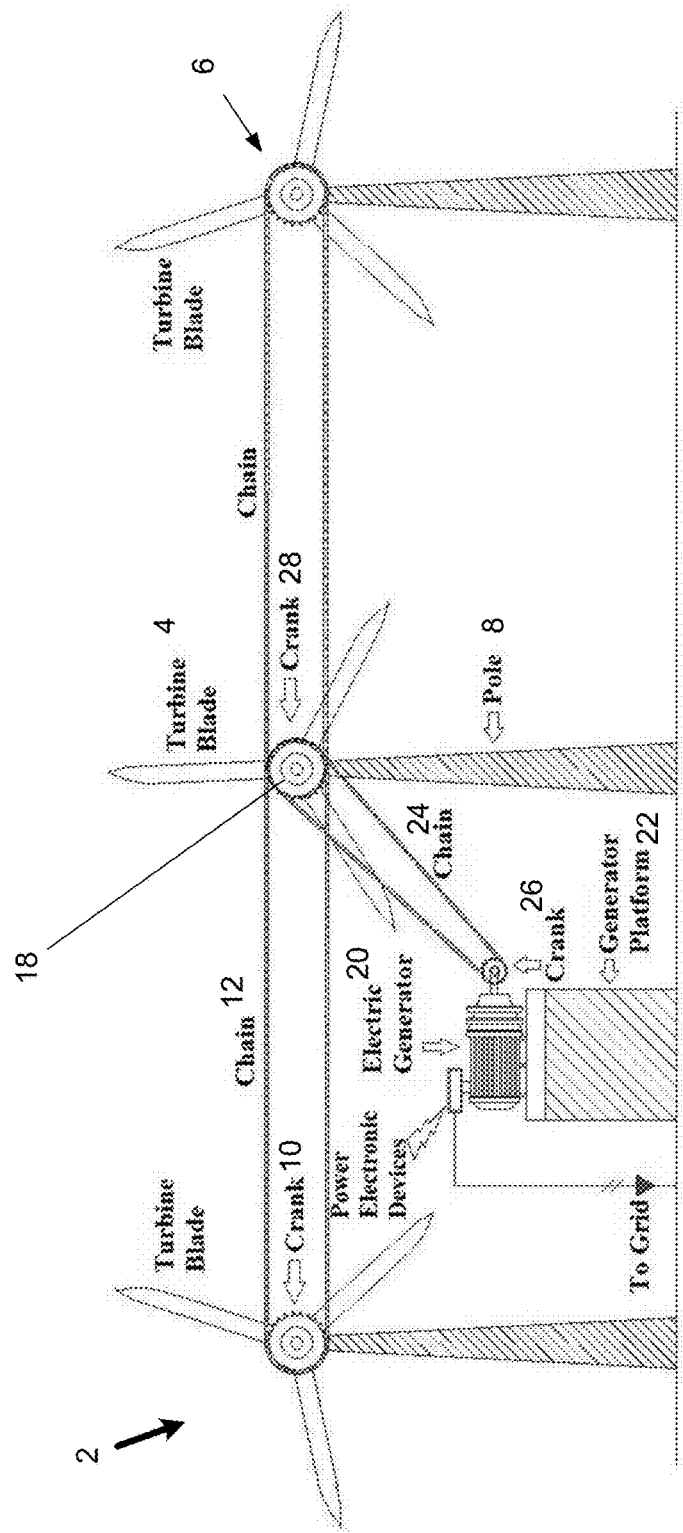
FIG. 1 shows a view of a multiple-turbine system in accordance with an embodiment of the present invention.

As seen in FIG. 1, in one exemplary embodiment the system comprises a plurality of wind turbines 2 mechanically connected to each other, and to a single generator 20. In the embodiment shown, three turbines are shown, although the present system can work with any number of turbines, and some advantages can be achieved even with a single wind turbine. Each turbine comprises a number of turbine blades 4 connected to a hub 6 at the top of a pole or tower 8. The hub has a shaft mechanically connected to a set of sprockets, chainwheels, cranks, or pulleys 10, which may be exposed or covered (such as in a modified nacelle 18). A pitch control mechanism may be employed as well.

The sprockets, chainwheels, cranks or pulleys 10 on adjacent turbines 2 are connected by a chain, cable, or similar mechanical linkage 12. In the embodiment shown, at least two sprockets, chainwheels, cranks or pulleys are used, with each being mechanically connected to a corresponding sprocket, chainwheel, crank or pulley on an adjacent turbine in the case where a turbine is located between two turbines. This allows the sprockets, chainwheels, cranks or pulleys on a turbine to be at different angles or alignments, so that while adjacent turbines in a series or sequence may be in a straight-line alignment, they need not be. In the case where a turbine is on the end of a line or sequence of turbines, it will only be connected to one adjacent turbine.

Figure 2:
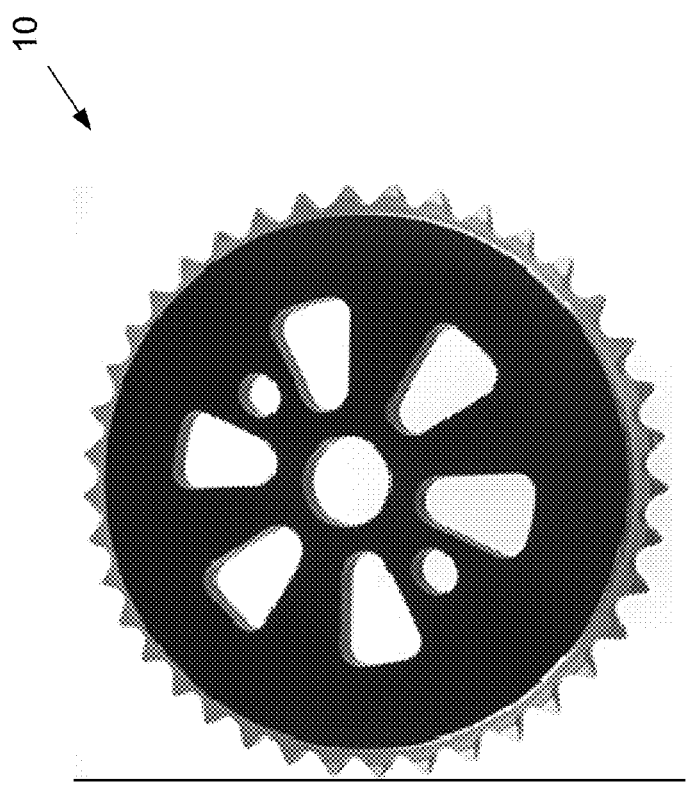
FIG. 2 shows a crank for use with the multiple-turbine system of FIG. 1.

FIG. 2 shows an example of a crank 10, which may be made of hard metal or other suitable material. In several embodiments, it is solidly coupled with the shaft of the wind turbine, and is used to connect the multiple turbines through the mechanical linkages described herein.

An electrical generator 20 is similarly mechanically linked to at least one of the turbines. In the embodiment shown in FIG. 1, the generator 20 is linked (through a sprocket, chainwheel, crank or pulley 26 on the generator) by a chain, cable, or similar mechanical linkage 24 to a power connection gear or third gear, crank or pulley 28 on the middle turbine of a sequence of three, although it may be linked to any of the turbines. The electrical generator may be located on the ground, on a platform 22, on a pole, or other location. This allows the individual turbines to be lighter (due to the absence of a generator on the turbine itself), thereby reducing the total load on the tower or pole. In one embodiment, the generator may be located in the nacelle of one of the turbines in the sequence, and that tower or pole may be increased in strength to handle the increase in total load.

In various embodiments, the present invention possesses several advantages over the prior art. No gearbox, electric generator, power electronic devices, or yaw mechanisms need be placed at the top of the tower, thereby reducing the total weight carried by the tower. Gear ratio can be maintained by proper selection of the gears and cranks of the generator and the turbine, so no conventional gearbox is required. The mechanical energy of multiple turbines is accumulated to the shaft of a single large generator. The number of generator and power electronic interfaces and systems is reduced, thereby reducing overall construction and installation costs and maintenance costs. In systems where the generator is set near the ground, maintenance and repair are substantially easier.

Another significant advantage is the reduction in the radius of the blades of each wind turbine, which decreases based on the number of wind turbines. This reduces the size and weight of each turbine, which reduces construction and installation costs as well as maintenance and repair costs. For example, 6 MW of power can be generated by multiple-turbine systems with the number of turbines and turbine radii as set forth below:

| Number of Wind Turbine | Radius of each Turbine in meter | Length of the chain in between consecutive two turbines in meter (Considering the clearance between two turbines = 3 m) |
|---|---|---|
| 1 | 74.0 | Chain is not required. |
| 3 | 42.7 | 88.4 |
| 6 | 30.2 | 63.4 |
| 8 | 26.1 | 55.2 |
| 10 | 23.4 | 49.8 |
| 14 | 19.8 | 42.6 |
| 20 | 16.5 | 36.0 |
| 25 | 14.8 | 32.6 |

To generate power of 6 MW (Assuming 5% mechanical power loss for multiple turbines); Air Density = 1.225 kg/m³; Wind speed = 11 m/s; Power coefficient = 0.45

Accordingly, the present invention will help implement higher capacity electrical generator systems, may be used in locations where the average or typical wind speed is below the cut-in wind speed for conventional wind turbines, and will lower the weight of each turbine and thus the construction and maintenance costs of each turbine. Further, a system of the present invention will be lower in construction and maintenance costs than a convention wind turbine generation system having the same power capacity.

The total torque captured by the multiple turbines may be determined as follows. Assume 'n' numbers of wind turbines having the same radius are integrated and they are receiving the wind speed $V_{w1}$, $V_{w2}$, $V_{w3}$, ..., $V_{wn}$, respectively. The rotational speed of the turbines will be $\omega_1$, $\omega_2$, $\omega_3$, ..., $\omega_n$, correspondingly. Designating the mechanical power captured by the first turbine from the wind flow as $P_1$, then $P_1$ can be expressed as, $$P_1 = \frac{1}{2} \rho \cdot \pi R^2 \cdot V_{w1}^3 \cdot C_p \qquad (1)$$

where, $\rho$=air density, R=radius of the turbine blades, and $C_p(\lambda, \beta)$=Betz constant or power coefficient. Designating the mechanical torque produced by the first turbine as $\tau_1$, then, $$\tau_1 = \frac{1}{2} \rho \cdot \pi \cdot R^2 \cdot V_{w1}^3 \cdot C_p / \omega_1 \qquad (2)$$

Designating the mechanical torques produced by the rest of the turbines as $\tau_2$, $\tau_3$, ..., $\tau_n$, respectively, then similar to (2), they can be expressed as follows, $$\tau_2 = \frac{1}{2} \rho \cdot \pi \cdot R^2 \cdot V_{w2}^3 \cdot C_p / \omega_2 \qquad (3)$$

$$\tau_3 = \tfrac{1}{2} \cdot \rho \cdot \pi \cdot R^2 \cdot V_{w3}^3 \cdot C_p / \omega_3 \qquad (4)$$

$$\tau_n = \tfrac{1}{2} \cdot \rho \cdot \pi \cdot R^2 \cdot V_{wn}^3 \cdot C_p / \omega_n \qquad (5)$$

Now, designating the total torque accumulated by all the turbines as $\tau_{total}$, then, $$\tau_{total} = k \cdot (\tau_1 + \tau_2 + \tau_3 + \ldots + \tau_n) \qquad (6)$$

where 'k' is defined as the loss factor due to the connection of multiple turbines which will be dependent on the weight of chain, distance between the consecutive turbines, aerodynamics of wind, land scape type of the wind site, and similar factors.

Now, putting the values of $\tau_1, \tau_2, \tau_3, \ldots, \tau_n$ in (6), we can get, $$\begin{aligned}\tau_{total} &= k \cdot \left(\tfrac{1}{2} \cdot \rho \cdot \pi R^2 \cdot V_{w1}^3 \cdot C_p / \omega_1 + \tfrac{1}{2} \cdot \rho \cdot \pi R^2 \cdot V_{w2}^3 \cdot C_p / \omega_2 + \right. \\ &\quad \left. \tfrac{1}{2} \cdot \rho \cdot \pi R^2 \cdot V_{w3}^3 \cdot C_p / \omega_3 + \ldots + \tfrac{1}{2} \cdot \rho \cdot \pi R^2 \cdot V_{wn}^3 \cdot C_p / \omega_n\right) \\ &= k \cdot \tfrac{1}{2} \cdot \rho \cdot \pi R^2 \cdot C_p \left(\frac{V_{w1}^3}{\omega_1} + \frac{V_{w2}^3}{\omega_2} + \frac{V_{w3}^3}{\omega_3} + \ldots + \frac{V_{wn}^3}{\omega_n}\right)\end{aligned} \qquad (7)$$

If all the turbines are set at the same height, it may be assumed that $V_{w1} = V_{w2} = V_{w3} = \ldots = V_{wn} = V_w$. Also, the rotational speed of all the wind turbines will be the same, as all the wind turbines will be coupled together. Therefore, we can also assume that, $\omega_1 = \omega_2 = \omega_3 = \ldots = \omega_n = \omega$, where $\omega$ is the rotational speed of all the wind turbines in rad/s.

Now, Equation (7) can be simplified as follows, $$\begin{aligned}\tau_{total} &= k \cdot \tfrac{1}{2} \cdot \rho \cdot \pi R^2 \cdot C_p \left(\frac{V_w^3}{\omega} + \frac{V_w^3}{\omega} + \frac{V_w^3}{\omega} + \ldots + \frac{V_w^3}{\omega}\right) \\ &= k \cdot \tfrac{1}{2} \cdot \rho \cdot \pi R^2 \cdot C_p \cdot n \cdot V_w^3 / \omega\end{aligned} \qquad (8)$$

Finally, comparing (2) and (8), it is clearly found that the generated torque will be increased by 'k·n' times when multiple turbines are connected together, and subsequently the electric power generation by a single unit generator will be increased. The system is applicable to both the fixed speed and variable speed wind generator systems.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An apparatus, comprising:
two or more wind turbines in a series, each wind turbine separately comprising a nacelle with vertically rotating blades supported on a separate vertical tower extending from the nacelle to the ground;
further wherein each wind turbine is mechanically connected to one or more adjacent turbines.

2. The apparatus of claim 1, further comprising an electrical generator, mechanically connected to one of said wind turbines.

3. The apparatus of claim 2, wherein one or more of said wind turbines do not have electrical generators in or on the wind turbine.

4. The apparatus of claim 2, further wherein energy generated by each wind turbine is accumulated by the electrical generator.

5. The apparatus of claim 2, wherein the wind turbines generate energy at wind speeds below 4 m/s or 9 mph.

6. The apparatus of claim 2, wherein said electrical generator is not located in or on any of the wind turbines.

7. The apparatus of claim 6, wherein said electrical generator is located on the ground, or on a generator platform on the ground.

8. The apparatus of claim 2, wherein said electrical generator is located in or on one of said wind turbines.

9. The apparatus of claim 1, wherein the mechanical connection between adjacent wind turbines comprises one or more sprockets, chainwheels, cranks or pulleys on each turbine, and a chain or cable connecting said one or more sprockets, chainwheels, cranks or pulleys.

10. A method of generating energy, comprising:
mechanically connecting two or more wind turbines in a series, each wind turbine separately comprising a nacelle with vertically rotating blades supported on a separate vertical tower extending from the nacelle to the ground; further wherein each wind turbine is connected to one or more adjacent turbines; and
mechanically connecting an electrical generator to one of said wind turbines;
wherein energy generated by each wind turbine is accumulated by the electrical generator.

11. The method of claim 10, wherein the wind turbines generate energy at wind speeds below 4 m/s or 9 mph.

12. The method of claim 10, wherein said electrical generator is located on the ground, or on a generator platform on the ground.

13. The method of claim 10, wherein said electrical generator is located in or on one of said wind turbines.

14. The method of claim 10, wherein one or more of said wind turbines do not have electrical generators in or on the wind turbine.

* * * * *